United States Patent
Wang et al.

(10) Patent No.: US 10,743,303 B2
(45) Date of Patent: Aug. 11, 2020

(54) WIRELESS COMMUNICATION METHOD, APPARATUS AND SYSTEM

(71) Applicant: Panasonic Intellectual Property Corporation of America, Torrance, CA (US)

(72) Inventors: Lilei Wang, Beijing (CN); Joachim Loehr, Hessen (DE)

(73) Assignee: Panasonic Intellectual Property Corporation Of America, Torrance, CA (US)

( * ) Notice: Subject to any disclaimer, the term of this patent is extended or adjusted under 35 U.S.C. 154(b) by 0 days.

(21) Appl. No.: 16/322,857

(22) PCT Filed: Sep. 29, 2016

(86) PCT No.: PCT/CN2016/100762
§ 371 (c)(1),
(2) Date: Feb. 1, 2019

(87) PCT Pub. No.: WO2018/058418
PCT Pub. Date: Apr. 5, 2018

(65) Prior Publication Data
US 2019/0182827 A1    Jun. 13, 2019

(51) Int. Cl.
*H04W 72/04* (2009.01)
*H04W 72/12* (2009.01)
*H04W 56/00* (2009.01)

(52) U.S. Cl.
CPC ... *H04W 72/0426* (2013.01); *H04W 56/0035* (2013.01); *H04W 56/0045* (2013.01); *H04W 72/0446* (2013.01); *H04W 72/1278* (2013.01)

(58) Field of Classification Search
CPC . H04W 72/04; H04W 56/00; H04W 72/1278; H04W 56/0035; H04W 72/0446; H04W 72/0426; H04W 56/0045
See application file for complete search history.

(56) References Cited

U.S. PATENT DOCUMENTS

| | | | |
|---|---|---|---|
| 2014/0198733 A1* | 7/2014 | Yin | H04L 1/1812 370/329 |
| 2014/0341125 A1* | 11/2014 | Dayal | H04B 7/0814 370/329 |

OTHER PUBLICATIONS

International Search Report of PCT application No. PCT/CN2016/100762 dated May 26, 2017.
Nokia, Alcatel-Lucent Shanghai Bell, On SCI Contents, 3GPP TSG-RAN WG1#85 R1-165046, 3GPP, May 23-27, 2016.
Ericsson, Proposed Correction to 36.213: PSSCH Reception Timing, 3GPP TSG-RAN WG1#80 R1-150654, 3GPP, Feb. 9-13, 2015.
Huawei, HiSilicon, Discussion on D2D demodulation requirements, 3GPP TSG-RAN WG4#74bis R4-151411, 3GPP, Apr. 20-24, 2015.
Intel Corporation, Scheduling Assignment for Sidelink V2V Communication, 3GPP TSG-RAN WG1#85 R1-164141, 3GPP, May 23-27, 2016.

* cited by examiner

*Primary Examiner* — Kyaw Z Soe
(74) *Attorney, Agent, or Firm* — Seed IP Law Group LLP

(57) ABSTRACT

There are provided an apparatus, a method and a system. The apparatus, at a first node, comprises: a transmitter, operative to transmit control channels and/or user shared channels to a second node; and a controller, operative to make different interpretations on time and/or frequency position indications in a control signaling for transmission of the user shared channels according to a subframe scheduling mode.

20 Claims, 6 Drawing Sheets

- DCI for dynamic scheduling:
  - At least the following fields are included in the DCI
    - CIF (3 bits)
      - Interpretation of CIF is (pre)configured. This (pre)configuration can be different from CIF for UL/DL.
    - Lowest index of the sub-channel allocated to the initial transmission
    - SA content
      - Time gap between initial transmission and retransmission: [4] bits
      - Frequency resource location of the initial transmission and retransmission: 8 bits
    - FFS
      - TPC
  - The DCI length is the same as DCI format 0 configured for UL of the UE.
    - An RNTI different from C-RNTI/SPS-RNTI is used.
  - Time location of the initial transmission is the first subframe included in the resource pool on the V2V carrier that occurs after 4 ms from the DCI transmission subframe.

Fig.4B

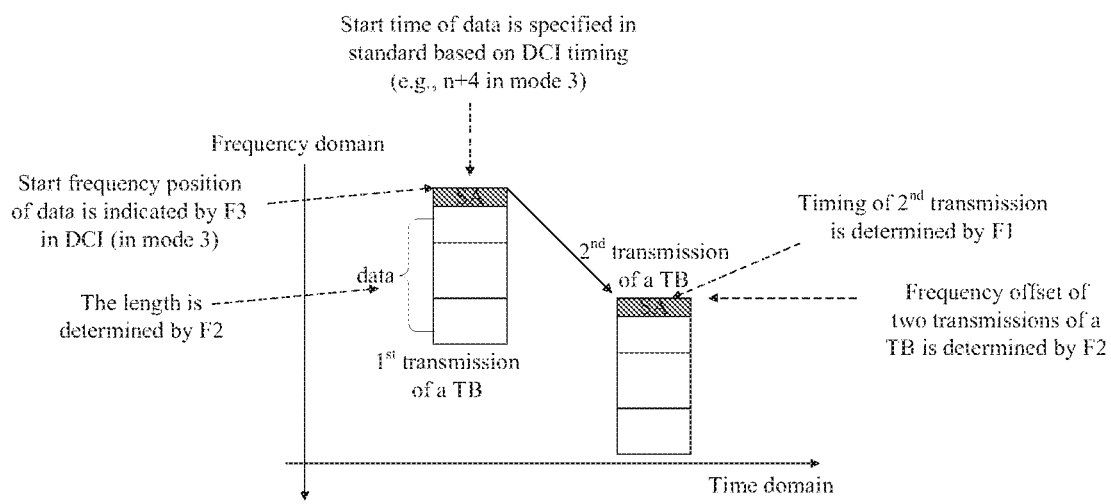

F1: Time gap between initial transmission and retransmission
F2: Frequency resource location of the initial transmission and retransmission (jointly coding)
F3: Lowest index of the sub-channel allocated to the initial transmission

Fig. 5

F1: Time gap between initial transmission and retransmission
F2: Frequency resource location of the initial transmission and retransmission (jointly coding)
F3: Lowest index of the sub-channel allocated to the initial transmission

1000

1001: by a transmitter, transmitting control channels and/or user shared channels to a second node 1002: by a controller, making different interpretations on time and/or frequency position indications in a control signaling for transmission of the user shared channels according to a subframe scheduling mode

WIRELESS COMMUNICATION METHOD, APPARATUS AND SYSTEM

BACKGROUND

1. Technical Field

The present technology relates to wireless communication field, and more particular, to a wireless communication method, apparatus and system.

2. Description of the Related Art

In a wireless communication field, end-user radio or wireless terminals, also known as user equipment units (UEs), communicate via a wireless network such as a radio access network (RAN) with a radio base station (RBS), also called "eNodeBs" (eNBs). The radio access network (RAN) covers a geographical area which is divided into cell areas, with each cell area being served by a radio base station.

Initial version on V2V (vehicle to vehicle) standard has been finalized in 3GPP RAN1 and it supports same subframe scheduling of Physical Sidelink Shared Channel (PSSCH) (data) and Physical Sidelink Control Channel (PSCCH) (or Scheduling Assignment (SA)), which includes adjacent and non-adjacent transmission of PSSCH and PSCCH. The same subframe scheduling of PSSCH (data) and PSCCH (or SA) means that the PSSCH signal (data) and the PSCCH (or SA) signal are transmitted in one same subframe, as shown in the left area of FIG. 1. FIG. 1 schematically shows an elaboration on same/different subframe scheduling.

SUMMARY

On the other hand, different subframe scheduling may be discussed/decided in future V2X (vehicle to anything, like vehicle to pedestrian, vehicle to network/infrastructure and vehicle to vehicle) study/work items. The different subframe scheduling of PSSCH and PSCCH (or SA) means that the PSSCH signal and the PSCCH (or SA) signal are transmitted not in the same subframe, as shown in the right area of FIG. 1.

In one aspect, there is provided an apparatus, at a first node, comprising: a transmitter, operative to transmit control channels and/or user shared channels to a second node; and a controller, operative to make different interpretations on time and/or frequency position indications in a control signaling for transmission of sidelink channels according to a subframe scheduling mode.

In another aspect, there is provided a method, at a first node, comprising: by a transmitter, transmitting control channels and/or user shared channels to a second node; and by a controller, making different interpretations on time and/or frequency position indications in a control signaling for transmission of sidelink channels according to a subframe scheduling mode.

In another aspect, there is provided a system, at a first node, comprising: one or more processors; a memory coupled with the one or more processors, storing computer programs therein, when executed by the one or more processors, to perform a method as above mentioned.

BRIEF DESCRIPTION OF DRAWINGS

FIG. 4B schematically shows agreed Downlink Control Information (DCI) content in 3GPP RAN1 meeting #86.

FIG. 5 schematically shows the same subframe scheduling in V2V (adjacent transmission of SA and data).

DETAILED DESCRIPTION

Embodiments will now be described with reference to FIGS. 2 through 11, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1:
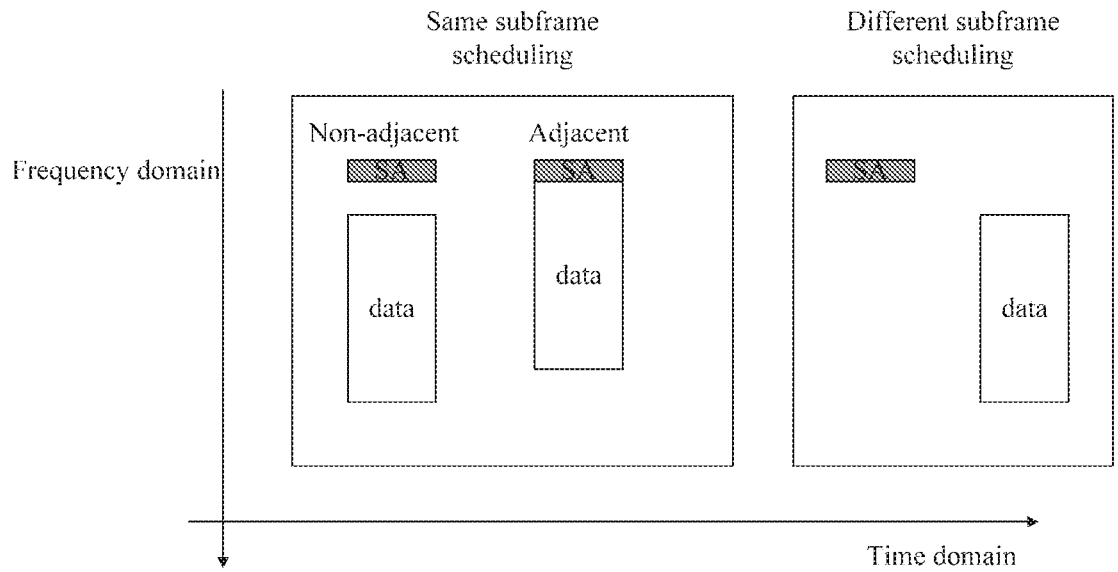
FIG. 1 schematically shows an elaboration on same/different subframe scheduling.
Figure 2:
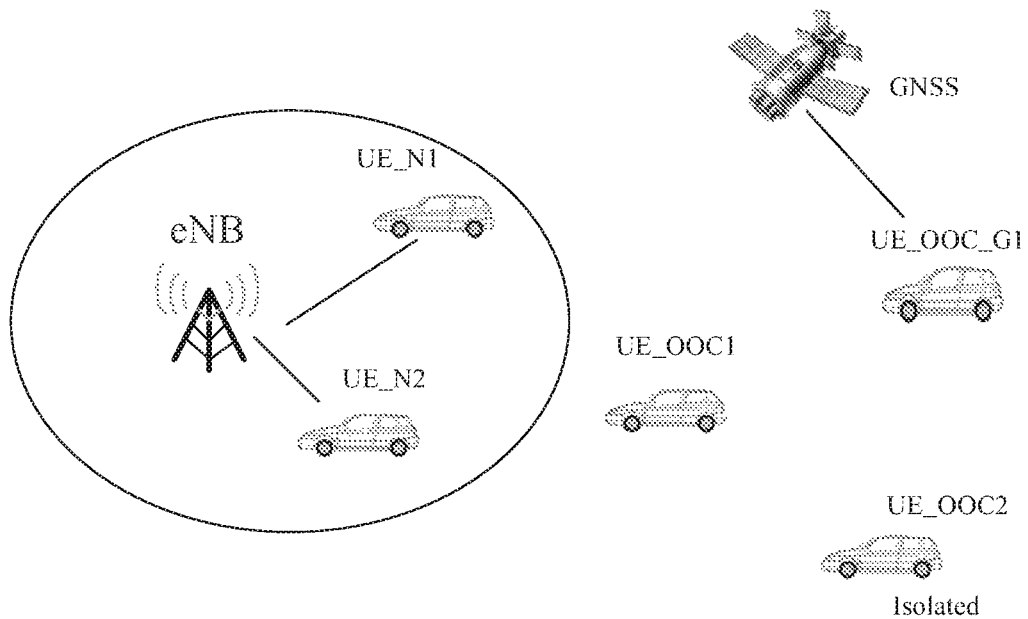
FIG. 2 schematically shows a scenario for vehicle communication.

FIG. 2 schematically shows a scenario for vehicle communication.

As shown in FIG. 2, the eNB may communicate with the UEs (such as UE_N1 and UE_N2 in vehicles) in downlink channel and uplink channel. And The UE_N1 and UE_N2 can communicate with each other in sidelink channel. The UEs, such as UE_OCC1, UE_OCC2, and UE_OCCG1 in vehicles, are out of cellular network coverage, and UE_OCCG1 in a vehicle can be synchronized with Global Navigation Satellite System (GNSS).

Similar as Rel.12/13 D2D (device to device), there are two sidelink transmission modes supported in V2V (vehicle to vehicle).

Figures 3, 4A:
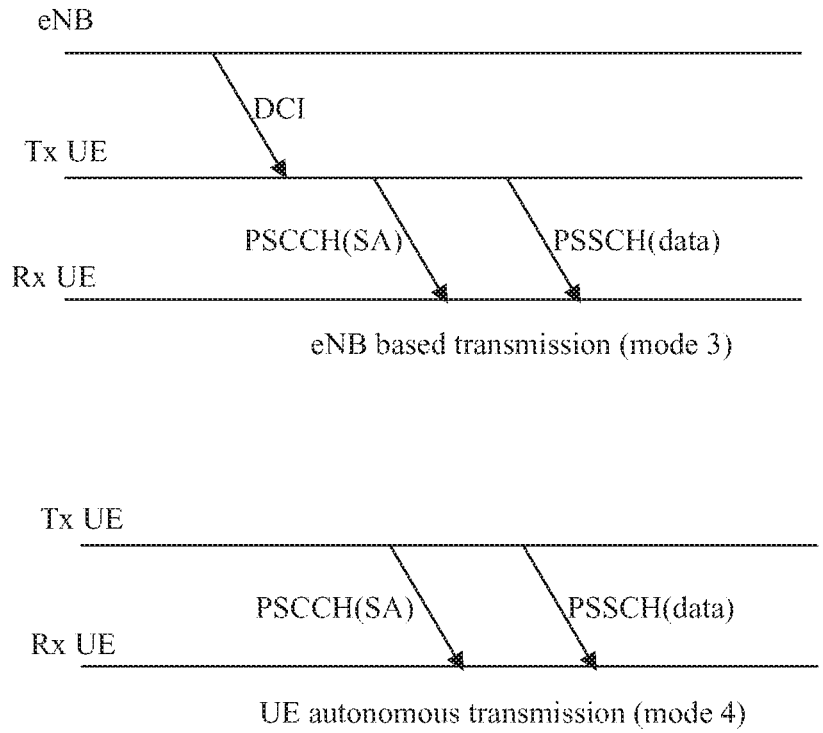
FIG. 3 schematically shows transmission timings by eNB based transmission and by UE autonomous transmission, respectively.
FIG. 4A schematically shows agreed Sidelink Control Information (SCI) content in 3GPP RAN1 meeting #86.

One is eNB based transmission mode (e.g., sidelink transmission mode 3). The eNB selects the sidelink resources and needs to transmit DCI to indicate PSCCH (SA)/PSSCH (data) resource information to the transmitter UE who will transmit PSSCH (data) and PSCCH (SA) in sidelink accordingly. For example in FIG. 2, UE_N1 and UE_N2 which is in network coverage could be operated with such mode. The timing in such eNB based mode is shown in the upper area of FIG. 3. FIG. 3 schematically shows transmission timings by eNB based transmission mode and by UE autonomous transmission mode, respectively.

Another sidelink transmission mode is UE autonomous mode without eNB's involvement on resource selection (e.g., mode 4). That is, the UE is in charge of PSCCH (SA) and PSSCH (data)'s resource selection and transmission. As shown in FIG. 2, the UE_OOC_G1, UE_OOC1 and UE_OOC2 which are out of network coverage, and could be operated with such mode. The timing in such UE autonomous mode is shown in the lower area of FIG. 3.

Based on the agreements on SCI and DCI of V2V in 3GPP RAN1#86 meeting, all fields on resource allocation in SCI or DCI are related with PSSCH (data), for example (to be particularly described with reference to FIG. 4A and FIG. 4B):

Time gap between initial transmission and retransmission (in SCI and DCI, named as F1)

Frequency resource location (in SCI and DCI, named as F2)

Lowest index of the subchannel allocation (only in DCI, named as F3)

Based on agreements in 3GPP RAN1#86, the SCI/DCI contents are particularly shown in FIG. 4A and FIG. 4B. FIG. 4A schematically shows agreed Sidelink Control Information (SCI) content in 3GPP RAN1#86 meeting. FIG. 4B schematically shows agreed Downlink Control Information (DCI) content in 3GPP RAN1#86 meeting.

FIG. 5 schematically shows the same subframe scheduling in V2V (adjacent transmission of SA and data).

Based on such agreements, FIG. 5 show one example on how these fields (F1, F2 and/or F3 as shown in FIG. 5) are interpreted. Here, the assumption is the adjacent transmission between PSCCH (SA) and PSSCH (data), and the transmission number of a SA is two (a first transmission and a second transmission, or an initial transmission and a retransmission). The start time of the PSSCH (data) is specified in the standard, for example n+4 in sidelink transmission mode 3, assuming the DCI reception time is subframe # n, which means that the PSSCH (data) is started to be transmitted in the 4th subframe after the DCI reception time. The start frequency position of PSSCH (data) is indicated by F3 in DCI in the case of sidelink transmission mode 3. The length of PSSCH (data) is determined by F2. For the retransmission/$2^{nd}$ transmission of a PSSCH (data), the timing is determined by F1 and the frequency position is determined by F2. For the adjacent transmissions of PSCCH (SA) and PSSCH (data), the relevant PSCCH (SA) is located at physical resource blocks (PRBs) with a lowest index of PSSCH (data), indicating the start frequency position of the PSSCH (data).

For non-adjacent transmission of PSCCH (SA) and PSSCH (data), the indication manner is almost same as the adjacent one. The only difference is that there is a fixed offset in frequency between transmission of PSCCH (SA) and PSSCH (data) in the same subframe.

But current SCI/DCI design only supports the same subframe scheduling. How to support the different subframe scheduling is unclear. Especially for the eNB based transmission mode, how to design the DCI to support different subframe scheduling is unclear. Considering current indication on resources in SCI/DCI is only related to PSSCH (data), to further indicate the timing and frequency position of the transmission of PSCCH (SA) in SCI/DCI for the different subframe scheduling will increase DCI/SCI size, and may need to design two different DCI/SCI formats for same subframe scheduling or different subframe scheduling respectively, which will make the standard more complicated. So how to design the DCI/SCI format which does not increase its size and complexity is a target for the different subframe scheduling.

Figure 6:
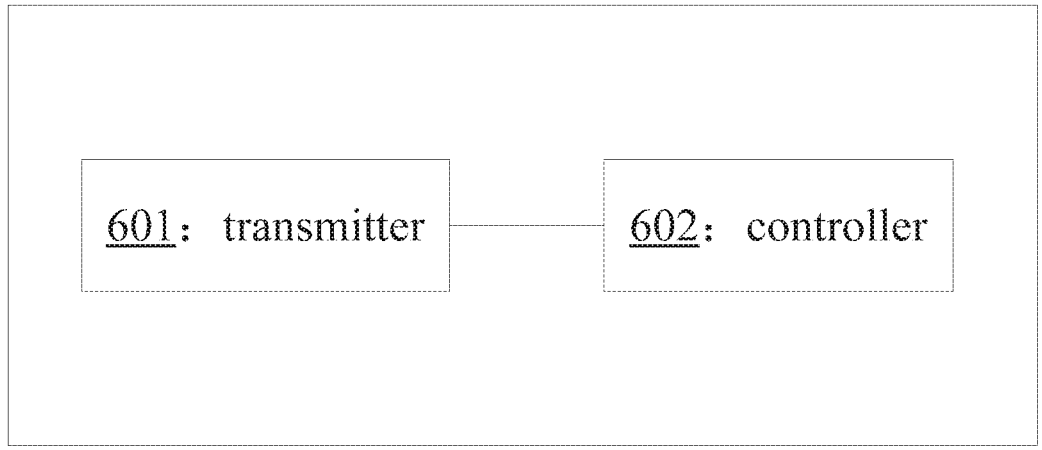
FIG. 6 schematically shows a block diagram of an apparatus at a first node according to an embodiment of the invention.

FIG. 6 schematically shows a block diagram of an apparatus 600 at a first node according to an embodiment of the invention.

As shown in FIG. 6, apparatus, at a first node, comprising: a transmitter, operative to transmit control channels and/or user shared channels to a second node; and a controller, operative to make different interpretations on time and/or frequency position indications in a control signaling for transmission of sidelink channels according to a subframe scheduling mode.

Thus, based on a subframe scheduling mode, the time and/or frequency position indications in a control signaling for transmission of sidelink channels can be differently interpreted, without adding additional time and/or frequency position indications in a control signaling for transmission of sidelink channels to be transmitted, so that the time and/or frequency position indications in a control signaling for transmission of the user shared channels of sidelink can be reused as time and/or frequency position indications in a control signaling for transmission of the control channels of sidelink based on the subframe scheduling mode. The signaling size can be optimized.

In an embodiment, the control channels may include Physical Downlink Control Channel (PDCCH), Enhanced Physical Downlink Control Channel (EPDCCH) and/or Physical Sidelink Control Channel (PSCCH), the user shared channel includes Physical Downlink Shared channel (PDSCH) and/or Physical Sidelink Shared Channel (PSSCH), and the control signaling includes Downlink Control Information (DCI) and/or Sidelink Control Information (SCI).

Actually, the embodiment can be used in a case of base station based transmission mode, in which the first node is an eNodeB (eNB) or any other base station and the second node is a user equipment (UE), or alternatively, the first node is transmitter UE and the second node is a receiver UE. In this case, the eNB can transmit a DCI with time and/or frequency position indications for transmission of the user shared channels of sidelink to the UE, and the UE which received the DCI can interpret such time and/or frequency position indications for the user shared channels as that for the control channel. To the time and/or frequency position indications in corresponding SCI signaling could be for the user shared channels or for control channels. There are two options on such interpretation of time/frequency indications in SCI and which option is used could be specified, configured by eNB, preconfigured by UE or based on subframe scheduling mode (different subframe scheduling or same subframe scheduling).

That is, in a case of base station based sidelink transmission mode, the first node is an eNodeB (eNB) or any other base station and the second node is a user equipment (UE), or the first node is transmitter UE and the second node is a receiver UE, the controller is operative to: if the subframe scheduling mode indicates same subframe scheduling of the control channel (e.g., PSCCH) and the user shared channel (e.g., PSSCH), cause the transmitter to transmit the time and/or frequency position indications for transmission of the user shared channels in the control signaling to the second node by interpreting the time and/or frequency position indications as time and/or frequency position indications for the user shared channels, and if the subframe scheduling mode indicates different subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the control channel.

Actually, the embodiment can be used in a case of UE autonomous transmission mode, in which the first node is a transmitter UE, and the second node is a receiver UE. The UE does not need a DCI from the eNB, and can understand whether the time and/or frequency position indications are for the control channels or the user shared channels based on different scheduling mode, configuration by base station, pre-configured or specified in standard. In this case, the controller is operative to: if the subframe scheduling mode indicates same subframe scheduling of the control channel and the user shared channel, interpret the time and/or frequency position indications in a control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpret the time and/or frequency position indications in the control signaling as time and/or frequency position indications for the control channel of sidelink, for transmission of sidelink channels including the control channels and the user shared channels.

So, no matter in the case of base station based transmission mode or UE autonomous transmission mode, the signaling size can be optimized.

In an embodiment, the same subframe scheduling mode of the control channels and the user shared channels is based on resource pool configuration of the user shared channels or the control channels, wherein the resource pool consists of time/frequency resources which could be used for sidelink transmission.

The same subframe scheduling mode of the control channels and the user shared channels indicates that the scheduling of the control channels and the user shared channels are scheduled in a same subframe. The different subframe scheduling mode of the control channels and the user shared channels or control channels indicates that the scheduling of the control channels and the user shared channels are scheduled not in a same subframe.

In an embodiment, the time and/or frequency position indications include at least one of:
(1) a start timing for initial transmission of a transport block or control channel;
(2) a frequency start position for the initial transmission of a transport block or control channel;
(3) a time gap between the initial transmission and a retransmission of a transport block or control channel;
(4) a frequency offset between the initial transmission and the retransmission of a transport block or control channel; and
(5) length of a transport block.

In the case that the first node is an eNodeB (eNB), and the second node is a user equipment (UE), the time and/or frequency position indications transmitted by the eNB in downlink control information (DCI) includes (2), (3), (4) and (5). In the case that the first node is a transmitter UE, and the second node is a receiver UE, the time and/or frequency position indications transmitted by the transmitter UE in sidelink control information (SCI) includes (3), (4) and (5).

In the case of DCI/SCI, the controller is operative to, if subframe scheduling mode indicates a different subframe scheduling of the control channel and the user shared channel:
  interpret a "time gap between initial transmission and retransmission" field (or called as F1) in downlink control information (DCI)/sidelink control information (SCI) as a time relation between initial transmission and retransmission of the control channel (e.g., PSCCH);
  interpret a "frequency resource location of initial transmission and retransmission" field (or called as F2) in DCI/SCI as frequency resource location of retransmission of the control channel (e.g., PSCCH) and length of the user shared channel (e.g., PSSCH);
  interpret a "lowest index of a sub-channel allocated to initial transmission" field (or called as F3) in DCI as a frequency start position of initial transmission of the control channel (e.g., PSCCH), if there is the "lowest index of a sub-channel allocated to initial transmission" in DCI.

To be noted that the SCI does not have the "lowest index of a sub-channel allocated to initial transmission" field.

In particular, in order to make the interpretation on the time/frequency positions clearer, it is to elaborate an example about how such DCI/SCI format (with the above fields) and/or size is used for the same subframe scheduling and the different subframe scheduling of PSCCH (SA) and PSSCH (data). That is, the interpretation of resource allocation fields depends on the scheduling manner (the same subframe scheduling or the different subframe scheduling).

In the case of the same subframe scheduling of PSCCH (SA) and PSSCH (data), the indication of time/frequency resources in SCI/DCI of V2V is relevant with PSSCH (data) as usual, as shown in the above mentioned FIG. 5, and details are omitted.

In the case of the different subframe scheduling, the indication of time/frequency resources in SCI/DCI of V2V is relevant with PSCCH (SA) except for length of PSSCH (data), especially.
  "Time gap between initial transmission and retransmission" field (F1) in DCI/SCI is interpreted as the time relation between initial transmission and retransmission of the PSCCH (SA).
  Initial transmission of PSCCH (SA) is based on fixed timing based on received DCI, for example in subframe n+4 or n+X, here X the smallest integer which is larger than 4 assuming DCI is received in subframe n.
  "Frequency resource location of the initial transmission and retransmission" field in DCI/SCI is interpreted as "frequency resource location of retransmission of PSCCH(SA)" and "length of PSSCH (data)" field (F2) (in which the "Frequency resource location of the initial transmission and retransmission" field and the "length of PSSCH" field are joint coded).
  "Lowest index of the sub-channel allocated to the initial transmission" field (F3) in DCI is interpreted as frequency position of initial transmission of PSCCH (SA).

To summarize, the following table 1 and table 2 on DCI and SCI are shown,

TABLE 1

Interpretation on time/frequency resource related fields in DCI

| DCI content | Interpretation in same subframe scheduling | Interpretation in different subframe scheduling |
|---|---|---|
| Time gap between initial transmission and retransmission | time relation between initial transmission and retransmission of the PSSCH (data) | time relation between initial transmission and retransmission of the PSCCH (SA) |
| Frequency resource location of the initial transmission and retransmission | Frequency resource location of retransmission of PSSCH (data) and length of PSSCH (data) - joint coding) | Frequency resource location of retransmission of PSCCH (SA) and length of PSSCH (data) - joint coding |
| Lowest index of the sub-channel allocated to the initial transmission | frequency position of initial transmission of PSSCH (data) | frequency position of initial transmission of PSCCH (SA) |

TABLE 2

Interpretation on time/frequency resource related fields in SCI (SA)

| SCI content | Interpretation in same subframe scheduling | Interpretation in different subframe scheduling |
|---|---|---|
| Time gap between initial transmission and retransmission | time relation between initial transmission and retransmission of the PSSCH (data) | time relation between initial transmission and retransmission of the PSCCH (SA) |
| Frequency resource location of the initial transmission and retransmission | Frequency resource location of retransmission of PSSCH (data) and length of PSSCH (data) - joint coding) | Frequency resource location of retransmission of PSCCH (SA) and length of PSSCH (data) - joint coding |

Here PSCCH (SA) and associated PSSCH (data) will have fixed time/frequency relationship (one-by-one mapping), and whether to configure the different subframe scheduling mode or the same subframe scheduling mode of PSCCH(SA) and PSSCH(data) depends on resource pool configuration.

That is, in this embodiment, the controller is operative to: define a fixed time and/or frequency relationship between transmission of the control channel and transmission of the user shared channel of sidelink (also called as one-to-one mapping).

In this embodiment, the transmitter is operative to: transmit time and/or frequency position indications for the user shared channels of sidelink to the second node, so that the time and/or frequency position indications for the control channels of sidelink can be determined by the second node based on the fixed time and/or frequency relationship; or transmit time and/or frequency position indications for the control channels of sidelink to the second node, so that the time and/or frequency position indications for the user shared channels of sidelink can be determined by the second node based on the fixed time and/or frequency relationship.

With this one-to-one mapping, the time and/or frequency position of one of the control channel and the user shared channel can be determined from that of the other of the control channel and the user shared channel and the one-to-one mapping relationship.

Figure 7:
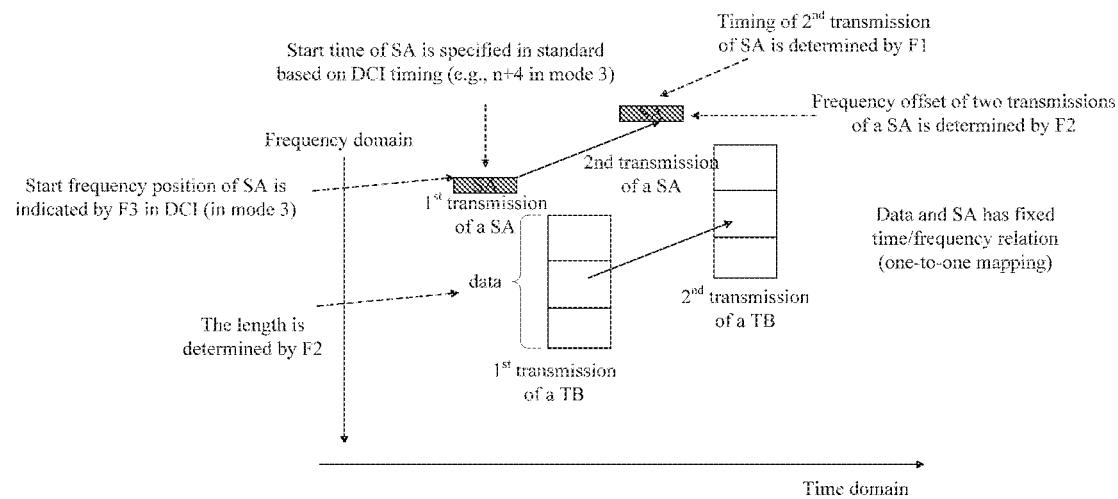
FIG. 7 schematically shows the different subframe scheduling in V2V according an embodiment of the invention.

FIG. 7 schematically shows the different subframe scheduling in V2V according an embodiment of the invention.

FIG. 7 elaborates how to interpret time/frequency resources in SCI/DCI. The start time of PSCCH (SA) is specified in standard, for example n+4 in mode 3 assuming DCI reception time is subframe # n. Start frequency position of PSCCH (SA) is indicated by F3 in DCI in case of mode 3. The length of PSSCH (data) is determined by F2. For the retransmission of PSCCH (SA), the timing is determined by F1 and frequency position is determined by F2. PSCCH(SA) and PSSCH(data) have fixed time/frequency relation.

The benefit of above solution is simple and common DCI/SA design and DCI/SA size is not increased.

Figure 8:
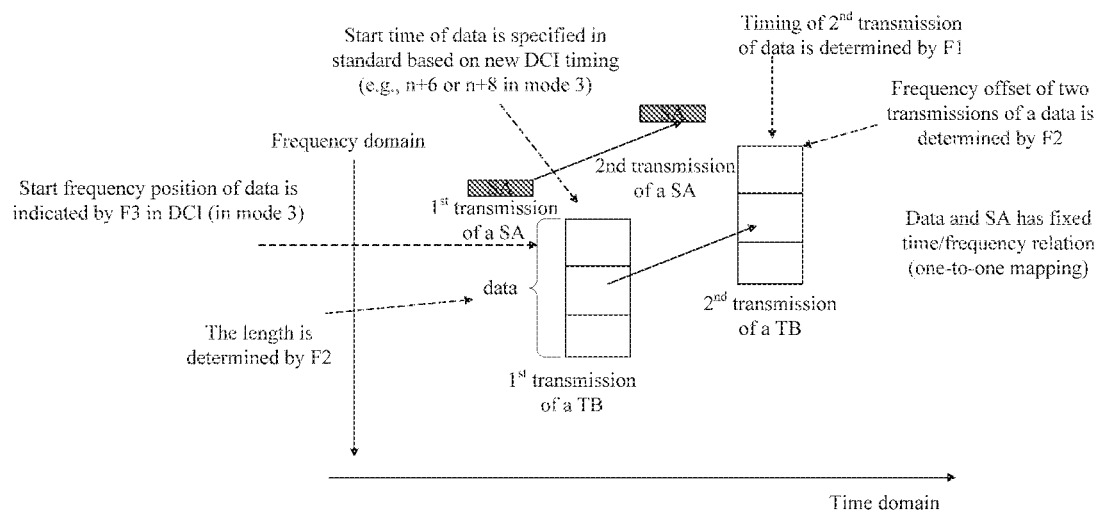
FIG. 8 schematically shows the different subframe scheduling in V2V according another embodiment of the invention.

FIG. 8 schematically shows the different subframe scheduling in V2V according another embodiment of the invention.

FIG. 8 is to elaborate an example that same DCI/SCI format and/or size is used for same subframe scheduling and different subframe scheduling of PSCCH (SA) and PSSCH (data) but the timing between DCI and PSSCH(data)

depends on scheduling manner (same subframe scheduling or different subframe scheduling).

In case of same subframe scheduling of PSCCH (SA) and PSSCH (data), the indication of time/frequency resources in SCI/DCI of V2V is relevant with PSSCH (data) but the timing between DCI and PSSCH (data) is the smallest integer which is larger than or equal to 4 assuming UE receives DCI in subframe n.

In case of different subframe scheduling, the indication of time/frequency resources in SCI/DCI of V2V is relevant with PSSCH (data) but the timing between DCI and PSSCH (data) is the smallest integer which is larger than or equal to X assuming UE receives DCI in subframe n. Here X is larger than 4, for example 6 or 8.

PSCCH (SA) and associated PSSCH (data) will have fixed time/frequency relationship (one-by-one mapping).

Whether to configure the different subframe scheduling or the same subframe scheduling of PSCCH(SA) and PSSCH (data) depends on resource pool configuration.

FIG. 8 elaborates how to interpret time/frequency resources in SCI/DCI and what the new timing is in case of different subframe scheduling. All time/frequency related fields are used for PSSCH (data) indication, which is the same as same subframe scheduling. Only difference is the timing between DCI and PSSCH (data) is changed to n+6 or n+8, which is larger than n+4 assuming DCI is received in subframe n.

The benefit of above solution is also simple and common DCI/SA design and DCI/SA size is not increased. In addition, the specification change is very small.

In summary, in this embodiment, the controller is operative to: if the subframe scheduling mode indicates the same subframe scheduling of the control channel and the user shared channel, in the case of base station based transmission mode, there is a first fixed timing relationship between a downlink control channel transmitting DCI received by the first node and a start timing for an initial transmission of the user shared channel, wherein, the first fixed timing relationship is smallest integer which is larger than or equal to a threshold X, if the subframe scheduling mode indicates the different subframe scheduling of the control channel and the user shared channel, in the case of base station based transmission mode, define a second fixed timing relationship between a timing of downlink control channel transmitting DCI received by second node and a start timing for initial transmission of the user shared channel, wherein the second fixed timing relationship is smallest integer which is larger than or equal to a threshold Y, in which Y is larger than X.

Another embodiment is similar as the above embodiment as shown in FIG. 8, which also assumes a new timing between received DCI and PSSCH (data), but the time/frequency field interpretation is different between DCI and SCI. The following table 3 and 4 are shown to describe the details.

TABLE 3

Interpretation on time/frequency resource related fields in DCI

| DCI content | Interpretation in same subframe scheduling | Interpretation in different subframe scheduling |
| --- | --- | --- |
| Time gap between initial transmission and retransmission | time relation between initial transmission and retransmission of the PSSCH (data) | Same as same subframe scheduling |
| Frequency resource location of the initial transmission and retransmission | Frequency resource location of retransmission of PSSCH (data) and length of PSSCH (data) - joint coding) | Same as same subframe scheduling |
| Lowest index of the sub-channel allocated to the initial transmission | frequency position of initial transmission of PSSCH (data) | Same as same subframe scheduling |

TABLE 4

Interpretation on time/frequency resource related fields in SCI (SA)

| SCI content | Interpretation in same subframe scheduling | Interpretation in different subframe scheduling |
| --- | --- | --- |
| Time gap between initial transmission and retransmission | time relation between initial transmission and retransmission of the PSSCH (data) | time relation between initial transmission and retransmission of the PSCCH (SA) |
| Frequency resource location of the initial transmission and retransmission | Frequency resource location of retransmission of PSSCH (data) and length of PSSCH (data) - joint coding) | Frequency resource location of retransmission of PSCCH (SA) and length of PSSCH (data) - joint coding |

The benefit of the above solution is also simple and common DCI/SA design and DCI/SA size is not increased.

Figure 9:
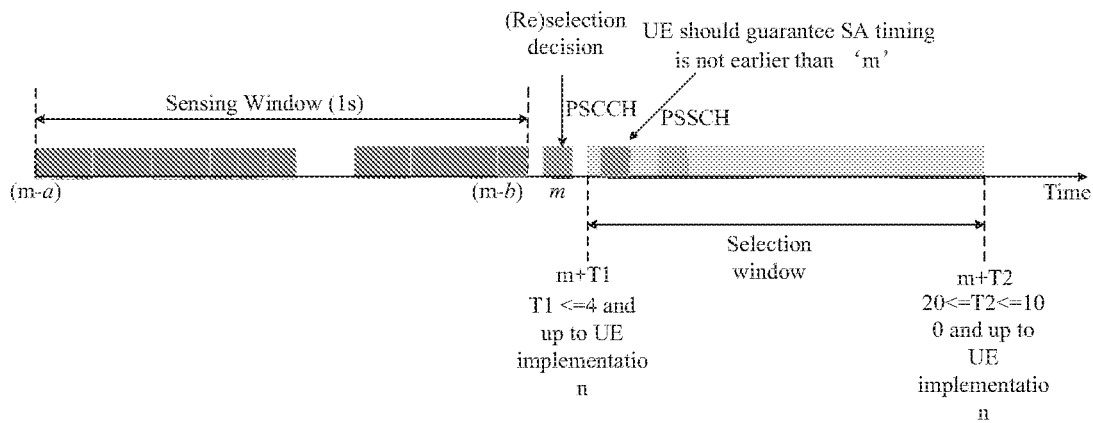
FIG. 9 schematically shows the different subframe scheduling in V2V according another embodiment of the invention.

FIG. 9 schematically shows the different subframe scheduling in V2V according another embodiment of the invention.

In this embodiment, the controller is operative to: if the subframe scheduling mode indicates the different subframe scheduling of the control channel and the user shared channel, in the case of SCI, guarantee timing of the transmission of the control channel not earlier than timing of selection or re-selection decision.

This embodiment is about some consideration on sensing. As shown in FIG. 9, basically the sensing mechanism used for the same subframe scheduling could be reused for the different subframe scheduling. But a UE should guarantee that the PSCCH (SA) timing is not earlier than the time on resource (re) selection decision.

Thus, with the embodiments of the invention, the signaling size can be optimized, the DCI/SA design can be simple and common, the DCI/SA size is not increased, and the specification change can be very small.

Figures 10, 11:
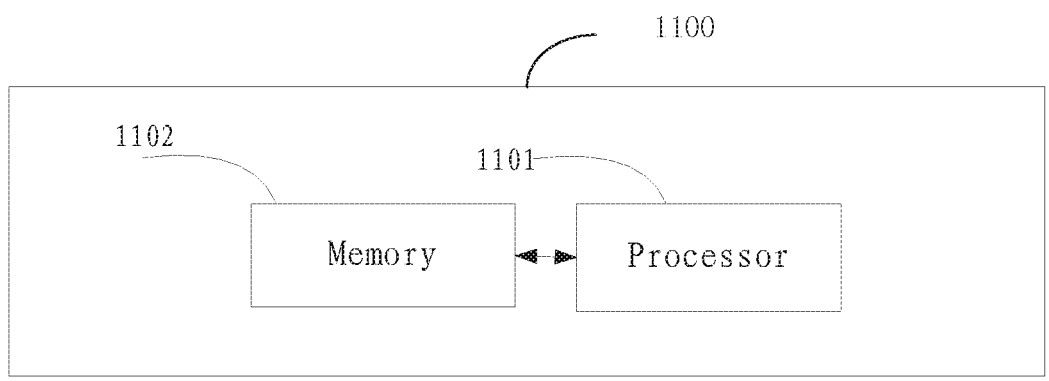
FIG. 10 schematically shows a flow chart of a method at a first node according an embodiment of the invention.
FIG. 11 schematically shows a block diagram of a system at a first node according to an embodiment of the invention.

FIG. 10 schematically shows a flow chart of a method 1000 at a first node according an embodiment of the invention.

The method 1000, at a first node, comprises steps of: step S1001, by a transmitter, transmitting control channels and/or user shared channels to a second node;

and step S1002, by a controller, making different interpretations on time and/or frequency position indications in a control signaling for transmission of the user shared channels according to a subframe scheduling mode.

In an embodiment, the making step S1002 further includes, by the controller: in a case of base station based transmission mode, the first node is an eNodeB (eNB) or any other base station and the second node is a user equipment (UE), or the first node is transmitter UE and the second node is a receiver UE, the making step S1002 further includes, by the controller: if the subframe scheduling mode indicates same subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the user shared channels; and if the subframe scheduling mode indicates different subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the control channel.

In an embodiment, in the case of UE autonomous transmission mode, the first node is a transmitter UE, and the second node is a receiver UE, the making step S1002 further includes, by the controller: if the subframe scheduling mode indicates same subframe scheduling of the control channel and the user shared channel, interpret the time and/or frequency position indications in a control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpret the time and/or frequency position indications in the control signaling as time and/or frequency position indications for the control channel of sidelink, for transmission of sidelink channels including the control channels and the user shared channels.

In an embodiment, the time and/or frequency position indications include at least one of: a start timing for initial transmission of a transport block or control channel; a frequency start position for the initial transmission of a transport block or control channel; a time gap between the initial transmission and a retransmission of a transport block or control channel; and a frequency offset between the initial transmission and the retransmission of a transport block or control channel; length of a transport block, wherein in the case that the first node is an eNodeB (eNB), and the second node is a user equipment (UE), the time and/or frequency position indications transmitted by the eNB in downlink control information (DCI) includes (2), (3), (4) and (5);

in the case that the first node is a transmitter UE, and the second node is a receiver UE, the time and/or frequency position indications transmitted by the transmitter UE in sidelink control information (SCI) includes (3), (4) and (5).

In an embodiment, the making step S1002 further includes, by the controller: define a fixed time and/or frequency relationship between transmission of the control channel and transmission of the user shared channel of sidelink.

In an embodiment, the making step S1002 further includes, by the controller: transmit time and/or frequency position indications for the user shared channels of sidelink to the second node, so that the time and/or frequency position indications for the control channels of sidelink can be determined by the second node based on the fixed time and/or frequency relationship; or transmit time and/or frequency position indications for the control channels of sidelink to the second node, so that the time and/or frequency position indications for the user shared channels of sidelink can be determined by the second node based on the fixed time and/or frequency relationship.

In an embodiment, the making step S1002 further includes, by the controller: if the subframe scheduling mode indicates the same subframe scheduling of the control channel and the user shared channel, in the case of base station based transmission mode, there is a first fixed timing relationship between a downlink control channel transmitting DCI received by the first node and a start timing for an initial transmission of the user shared channel, wherein, the first fixed timing relationship is smallest integer which is larger than or equal to a threshold X, if the subframe scheduling mode indicates the different subframe scheduling of the control channel and the user shared channel, in the case of base station based transmission mode, define a second fixed timing relationship between a timing of downlink control channel transmitting DCI received by second node and a start timing for initial transmission of the user shared channel, wherein the second fixed timing relationship is smallest integer which is larger than or equal to a threshold Y, in which Y is larger than X.

In an embodiment, the making step S1002 further includes, by the controller: if the subframe scheduling mode indicates the different subframe scheduling of the control channel and the user shared channel, in the case of SCI, guarantee timing of the transmission of the control channel not earlier than timing of selection or re-selection decision.

In an embodiment, the control channels include Physical Downlink Control Channel (PDCCH), Enhanced Physical Downlink Control Channel (EPDCCH) and/or Physical Sidelink Control Channel (PSCCH), the user shared channel includes Physical Downlink Shared channel (PDSCH) and/or Physical Sidelink Shared Channel (PSSCH), and the control signaling includes Downlink Control Information (DCI) and/or Sidelink Control Information (SCI).

In an embodiment, the same subframe scheduling mode of the control channels and the user shared channels is based on resource pool configuration of the user shared channels or the control channels, wherein the resource pool consists of time/frequency resources which could be used for sidelink transmission, and wherein the same subframe scheduling mode of the control channels and the user shared channels indicates that the scheduling of the control channels and the user shared channels are scheduled in a same subframe, and the different subframe scheduling mode of the control channels and the user shared channels or control channels indicates that the scheduling of the control channels and the user shared channels are scheduled not in a same subframe.

Thus, with the embodiments of the invention, the signaling size can be optimized, the DCI/SA design can be simple and common, the DCI/SA size is not increased, and the specification change can be very small.

FIG. 11 schematically shows a block diagram of a system 1100 at a first node according to an embodiment of the invention.

The system 1100, at a first node, comprises: one or more processors 1101; a memory 1102 coupled with the one or more processors, storing computer programs therein, when executed by the one or more processors, to perform a method as described above. The steps of the method and detailed description about the steps are omitted herein.

Thus, with the embodiments of the invention, the signaling size can be optimized, the DCI/SA design can be simple and common, the DCI/SA size is not increased, and the specification change can be very small.

In addition, embodiments of the present disclosure can at least provide the following subject matters.

(1) An apparatus, at a first node, comprising:
a transmitter, operative to transmit control channels and/or user shared channels to a second node; and
a controller, operative to make different interpretations on time and/or frequency position indications in a control signaling for transmission of the user shared channels according to a subframe scheduling mode.

(2) The apparatus according to (1), wherein,
the control channels include Physical Downlink Control Channel (PDCCH), Enhanced Physical Downlink Control Channel (EPDCCH) and/or Physical Sidelink Control Channel (PSCCH),
the user shared channel includes Physical Downlink Shared channel (PDSCH) and/or Physical Sidelink Shared Channel (PSSCH), and
the control signaling includes Downlink Control Information (DCI) and/or
Sidelink Control Information (SCI).

(3) The apparatus according to (1), wherein,
in a case of base station based transmission mode, the first node is an eNodeB (eNB) or any other base station and the second node is a user equipment (UE), or the first node is transmitter UE and the second node is a receiver UE,
the controller is operative to:
if the subframe scheduling mode indicates same subframe scheduling of the control channel and the user shared channel, cause the transmitter to transmit the time and/or frequency position indications in the control signaling to the second node by interpreting the time and/or frequency position indications as time and/or frequency position indications for the user shared channels; and if the subframe scheduling mode indicates different subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the control channel.

(4) The apparatus according to (1), wherein, in the case of UE autonomous transmission mode, the first node is a transmitter UE, and the second node is a receiver UE, the controller is operative to:
if the subframe scheduling mode indicates same subframe scheduling of the control channel and the user shared channel, interpret the time and/or frequency position indications in a control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpret the time and/or frequency position indications in the control signaling as time and/or frequency position indications for the control channel of sidelink, for transmission of sidelink channels including the control channels and the user shared channels.

(5) The apparatus according to (3) or (4), wherein, the same subframe scheduling mode of the control channels and the user shared channels is based on resource pool configuration of the user shared channels or the control channels, wherein the resource pool consists of time/frequency resources which could be used for sidelink transmission,
and wherein
the same subframe scheduling mode of the control channels and the user shared channels indicates that the scheduling of the control channels and the user shared channels are scheduled in a same subframe, and
the different subframe scheduling mode of the control channels and the user shared channels or control channels indicates that the scheduling of the control channels and the user shared channels are scheduled not in a same subframe.

(6) The apparatus according to (1), wherein, the time and/or frequency position indications include at least one of:
a start timing for initial transmission of a transport block or control channel;
a frequency start position for the initial transmission of a transport block or control channel;
a time gap between the initial transmission and a retransmission of a transport block or control channel;
a frequency offset between the initial transmission and the retransmission of a transport block or control channel; and
length of a transport block,
wherein in the case that the first node is an eNodeB (eNB), and the second node is a user equipment (UE), the time and/or frequency position indications transmitted by the eNB in downlink control information (DCI) includes (2), (3), (4) and (5);
in the case that the first node is a transmitter UE, and the second node is a receiver UE, the time and/or frequency position indications transmitted by the transmitter UE in sidelink control information (SCI) includes (3), (4) and (5).

(7) The apparatus according to (6),
wherein, the controller is operative to, if subframe scheduling mode indicates a different subframe scheduling of the control channel and the user shared channel:
interpret a "time gap between initial transmission and retransmission" field in downlink control information (DCI)/sidelink control information (SCI) as a time relation between initial transmission and retransmission of the control channel;

interpret a "frequency resource location of initial transmission and retransmission" field in DCI/SCI as frequency resource location of retransmission of the control channel and length of the user shared channel;

interpret a "lowest index of a sub-channel allocated to initial transmission" in DCI as a frequency start position of initial transmission of the control channel, if there is the "lowest index of a sub-channel allocated to initial transmission" in DCI.

(7) The apparatus according to (1), wherein, the controller is operative to:

define a fixed time and/or frequency relationship between transmission of the control channel and transmission of the user shared channel of sidelink.

(8) The apparatus according to (7), wherein, the transmitter is operative to:

transmit time and/or frequency position indications for the user shared channels of sidelink to the second node, so that the time and/or frequency position indications for the control channels of sidelink can be determined by the second node based on the fixed time and/or frequency relationship; or transmit time and/or frequency position indications for the control channels of sidelink to the second node, so that the time and/or frequency position indications for the user shared channels of sidelink can be determined by the second node based on the fixed time and/or frequency relationship.

(9) The apparatus according to (1), wherein, the controller is operative to:

if the subframe scheduling mode indicates the same subframe scheduling of the control channel and the user shared channel, in the case of base station based transmission mode, there is a first fixed timing relationship between a downlink control channel transmitting DCI received by the first node and a start timing for an initial transmission of the user shared channel, wherein, the first fixed timing relationship is smallest integer which is larger than or equal to a threshold X, if the subframe scheduling mode indicates the different subframe scheduling of the control channel and the user shared channel, in the case of base station based transmission mode, define a second fixed timing relationship between a timing of downlink control channel transmitting DCI received by second node and a start timing for initial transmission of the user shared channel, wherein the second fixed timing relationship is smallest integer which is larger than or equal to a threshold Y, in which Y is larger than X.

(10) The apparatus according to (1), wherein, the controller is operative to:

if the subframe scheduling mode indicates the different subframe scheduling of the control channel and the user shared channel, in the case of SCI, guarantee timing of the transmission of the control channel not earlier than timing of selection or re-selection decision.

(12). A method, at a first node, comprising steps of:

by a transmitter, transmitting control channels and/or user shared channels to a second node; and by a controller, making different interpretations on time and/or frequency position indications in a control signaling for transmission of the user shared channels according to a subframe scheduling mode.

(13) The method according to (12), wherein, the making step further includes, by the controller:

in a case of base station based transmission mode, the first node is an eNodeB (eNB) or any other base station and the second node is a user equipment (UE), or the first node is transmitter UE and the second node is a receiver UE.

the making step further includes, by the controller:

if the subframe scheduling mode indicates same subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the user shared channels; and if the subframe scheduling mode indicates different subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the control channel.

(14) The method according to (12), in the case of UE autonomous transmission mode, the first node is a transmitter UE, and the second node is a receiver UE, the making step further includes, by the controller:

if the subframe scheduling mode indicates same subframe scheduling of the control channel and the user shared channel, interpret the time and/or frequency position indications in a control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpret the time and/or frequency position indications in the control signaling as time and/or frequency position indications for the control channel of sidelink, for transmission of sidelink channels including the control channels and the user shared channels.

(15) The method according to (12), wherein, the time and/or frequency position indications include at least one of:

a start timing for initial transmission of a transport block or control channel;

a frequency start position for the initial transmission of a transport block or control channel;

a time gap between the initial transmission and a retransmission of a transport block or control channel; and a frequency offset between the initial transmission and the retransmission of a transport block or control channel;

length of a transport block, wherein in the case that the first node is an eNodeB (eNB), and the second node is a user equipment (UE), the time and/or frequency position indications transmitted by the eNB in downlink control information (DCI) includes (2), (3), (4) and (5);

in the case that the first node is a transmitter UE, and the second node is a receiver UE, the time and/or frequency position indications transmitted by the transmitter UE in sidelink control information (SCI) includes (3), (4) and (5).

(16) The method according to (12), wherein, the making step further includes, by the controller:

define a fixed time and/or frequency relationship between transmission of the control channel and transmission of the user shared channel of sidelink.

(17) The method according to (16), wherein, the making step further includes, by the controller:

transmit time and/or frequency position indications for the user shared channels of sidelink to the second node, so that the time and/or frequency position indications for the control channels of sidelink can be determined by the second node based on the fixed time and/or frequency relationship; or transmit time and/or frequency position indications for the control channels of sidelink to the second node, so that the time and/or frequency position indications for the user shared channels of sidelink can be determined by the second node based on the fixed time and/or frequency relationship.

(18) The method according to (12), wherein, the making step further includes, by the controller:

if the subframe scheduling mode indicates the same subframe scheduling of the control channel and the user shared channel, in the case of base station based transmission mode, there is a first fixed timing relationship between a downlink control channel transmitting DCI received by the first node and a start timing for an initial transmission of the user shared channel, wherein, the first fixed timing relationship is smallest integer which is larger than or equal to a threshold X, if the subframe scheduling mode indicates the different subframe scheduling of the control channel and the user shared channel, in the case of base station based transmission mode, define a second fixed timing relationship between a timing of downlink control channel transmitting DCI received by second node and a start timing for initial transmission of the user shared channel, wherein the second fixed timing relationship is smallest integer which is larger than or equal to a threshold Y, in which Y is larger than X.

(19) The method according to (12), wherein, the making step further includes, by the controller:

if the subframe scheduling mode indicates the different subframe scheduling of the control channel and the user shared channel, in the case of SCI, guarantee timing of the transmission of the control channel not earlier than timing of selection or re-selection decision.

(20) The method according to (12), wherein, the control channels include Physical Downlink Control Channel (PDCCH), Enhanced Physical Downlink Control Channel (EPDCCH) and/or Physical Sidelink Control Channel (PSCCH), the user shared channel includes Physical Downlink Shared channel (PDSCH) and/or Physical Sidelink Shared Channel (PSSCH), and the control signaling includes Downlink Control Information (DCI) and/or Sidelink Control Information (SCI).

(21) The method according to (13) or (14), wherein, the same subframe scheduling mode of the control channels and the user shared channels is based on resource pool configuration of the user shared channels or the control channels, wherein the resource pool consists of time/frequency resources which could be used for sidelink transmission, and wherein the same subframe scheduling mode of the control channels and the user shared channels indicates that the scheduling of the control channels and the user shared channels are scheduled in a same subframe, and the different subframe scheduling mode of the control channels and the user shared channels or control channels indicates that the scheduling of the control channels and the user shared channels are scheduled not in a same subframe.

(22) A system, at a first node, comprising:
one or more processors;
a memory coupled with the one or more processors, storing computer programs therein, when executed by the one or more processors, to perform a method as claimed in any one of (12)-(19).

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a 3GPP network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An apparatus, at a first node, comprising:
a transmitter, operative to transmit control channels and/or user shared channels to a second node; and
a controller, operative to make different interpretations on time and/or frequency position indications in a control signaling for transmission of the user shared channels according to a subframe scheduling mode,
wherein, in a case of base station based transmission mode, the first node is an eNodeB (eNB) or any other base station and the second node is a user equipment (UE), or the first node is transmitter UE and the second node is a receiver UE,
the controller is operative to:
if the subframe scheduling mode indicates same subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the user shared channels; and
if the subframe scheduling mode indicates different subframe scheduling of the control channel and the user shared channel, cause the transmitter to transmit the time and/or frequency position indications for transmission of the user shared channels in the control signaling to the second node by interpreting the time and/or frequency position indications as time and/or frequency position indications for the control channel.

2. The apparatus according to claim 1, wherein,
the control channels include Physical Downlink Control Channel (PDCCH), Enhanced Physical Downlink Control Channel (EPDCCH) and/or Physical Sidelink Control Channel (PSCCH),
the user shared channel includes Physical Downlink Shared channel (PDSCH) and/or Physical Sidelink Shared Channel (PSSCH), and
the control signaling includes Downlink Control Information (DCI) and/or Sidelink Control Information (SCI).

3. The apparatus according to claim 1, wherein, the same subframe scheduling mode of the control channels and the user shared channels is based on a resource pool configuration of the user shared channels or the control channels, wherein the resource pool consists of time/frequency resources which could be used for sidelink transmission,
and wherein
the same subframe scheduling mode of the control channels and the user shared channels indicates that the scheduling of the control channels and the user shared channels are scheduled in a same subframe, and
the different subframe scheduling mode of the control channels and the user shared channels indicates that the scheduling of the control channels and the user shared channels are scheduled not in a same subframe.

4. The apparatus according to claim 1, wherein, the time and/or frequency position indications include at least one of:
(1) a start timing for initial transmission of a transport block or control channel;
(2) a frequency start position for the initial transmission of a transport block or control channel;
(3) a time gap between the initial transmission and a retransmission of a transport block or control channel;
(4) a frequency offset between the initial transmission and the retransmission of a transport block or control channel; and
(5) length of a transport block,
wherein in the case that the first node is an eNodeB (eNB), and the second node is a user equipment (UE), the time and/or frequency position indications transmitted by the eNB in downlink control information (DCI) include (2), (3), (4) and (5);
in the case that the first node is a transmitter UE, and the second node is a receiver UE, the time and/or frequency position indications transmitted by the transmitter UE in sidelink control information (SCI) include (3), (4) and (5).

5. The apparatus according to claim 4,
wherein, the controller is operative to, if subframe scheduling mode indicates a different subframe scheduling of the control channel and the user shared channel:
interpret a "time gap between initial transmission and retransmission" field in downlink control information (DCI)/sidelink control information (SCI) as a time relation between initial transmission and retransmission of the control channel;
interpret a "frequency resource location of initial transmission and retransmission" field in DCI/SCI as frequency resource location of retransmission of the control channel and length of the user shared channel; and
interpret a "lowest index of a sub-channel allocated to initial transmission" in DCI as a frequency start position of initial transmission of the control channel, if there is the "lowest index of a sub-channel allocated to initial transmission" in DCI.

6. The apparatus according to claim 1, wherein, the controller is operative to:
define a fixed time and/or frequency relationship between transmission of the control channel and transmission of the user shared channel of sidelink.

7. The apparatus according to claim 6, wherein, the transmitter is operative to:
transmit time and/or frequency position indications for the user shared channels of sidelink to the second node, so that the time and/or frequency position indications for the control channels of sidelink can be determined by the second node based on the fixed time and/or frequency relationship; or
transmit time and/or frequency position indications for the control channels of sidelink to the second node, so that the time and/or frequency position indications for the user shared channels of sidelink can be determined by the second node based on the fixed time and/or frequency relationship.

8. The apparatus according to claim 1, wherein, the controller is operative to:
if the subframe scheduling mode indicates the same subframe scheduling of the control channel and the user shared channel, in the case of base station based transmission mode, there is a first fixed timing relationship between a timing of downlink control channel transmitting DCI received by the first node and a start timing for an initial transmission of the user shared channel,
wherein, the first fixed timing relationship is the smallest integer which is larger than or equal to a threshold X,
if the subframe scheduling mode indicates the different subframe scheduling of the control channel and the user shared channel, in the case of base station based transmission mode, define a second fixed timing relationship between a timing of downlink control channel transmitting DCI received by second node and a start timing for initial transmission of the user shared channel, wherein the second fixed timing relationship is the smallest integer which is larger than or equal to a threshold Y, in which Y is larger than X.

9. The apparatus according to claim 1, wherein, the controller is operative to:

if the subframe scheduling mode indicates the different subframe scheduling of the control channel and the user shared channel, in the case of SCI (sidelink control information), guarantee timing of the transmission of the control channel not earlier than timing of selection or re-selection decision.

10. A method, at a first node, comprising:

by a transmitter, transmitting control channels and/or user shared channels to a second node; and by a controller, making different interpretations on time and/or frequency position indications in a control signaling for transmission of the user shared channels according to a subframe scheduling mode, wherein, in a case of UE autonomous transmission mode, the first node is a transmitter UE, and the second node is a receiver UE, the making step further includes, by the controller:

if the subframe scheduling mode indicates same subframe scheduling of the control channel and the user shared channel, interpreting the time and/or frequency position indications in the control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpreting the time and/or frequency position indications in the control signaling as time and/or frequency position indications for the control channels of sidelink, for transmission of sidelink channels including the control channels and the user shared channels.

11. The method according to claim 10, wherein, the time and/or frequency position indications include at least one of:

(1) a start timing for initial transmission of a transport block or control channel;

(2) a frequency start position for the initial transmission of a transport block or control channel;

(3) a time gap between the initial transmission and a retransmission of a transport block or control channel; and (4) a frequency offset between the initial transmission and the retransmission of a transport block or control channel;

(5) length of a transport block, wherein in the case that the first node is an eNodeB (eNB), and the second node is a user equipment (UE), the time and/or frequency position indications transmitted by the eNB in downlink control information (DCI) include (2), (3), (4) and (5);

in the case that the first node is a transmitter UE, and the second node is a receiver UE, the time and/or frequency position indications transmitted by the transmitter UE in sidelink control information (SCI) include (3), (4) and (5).

12. The method according to claim 10, wherein, the making step further includes, by the controller:

defining a fixed time and/or frequency relationship between transmission of the control channel and transmission of the user shared channel of sidelink.

13. The method according to claim 12, wherein, the making step further includes, by the controller:

transmitting time and/or frequency position indications for the user shared channels of sidelink to the second node, so that the time and/or frequency position indications for the control channels of sidelink can be determined by the second node based on the fixed time and/or frequency relationship; or transmitting time and/or frequency position indications for the control channels of sidelink to the second node, so that the time and/or frequency position indications for the user shared channels of sidelink can be determined by the second node based on the fixed time and/or frequency relationship.

14. The method according to claim 10, wherein, the making step further includes, by the controller:

if the subframe scheduling mode indicates the same subframe scheduling of the control channel and the user shared channel, in the case of base station based transmission mode, there is a first fixed timing relationship between a timing of downlink control channel transmitting DCI received by the first node and a start timing for an initial transmission of the user shared channel, wherein, the first fixed timing relationship is the smallest integer which is larger than or equal to a threshold X, if the subframe scheduling mode indicates the different subframe scheduling of the control channel and the user shared channel, in the case of base station based transmission mode, defining a second fixed timing relationship between a timing of downlink control channel transmitting DCI received by second node and a start timing for initial transmission of the user shared channel, wherein the second fixed timing relationship is the smallest integer which is larger than or equal to a threshold Y, in which Y is larger than X.

15. The method according to claim 10, wherein, the making step further includes, by the controller:

if the subframe scheduling mode indicates the different subframe scheduling of the control channel and the user shared channel, in the case of SCI (sidelink control information), guaranteeing timing of the transmission of the control channel not earlier than timing of selection or re-selection decision.

16. An apparatus, at a first node, comprising:

a transmitter, operative to transmit control channels and/or user shared channels to a second node; and a controller, operative to make different interpretations on time and/or frequency position indications in a control signaling for transmission of the user shared channels according to a subframe scheduling mode, wherein, in a case of UE autonomous transmission mode, the first node is a transmitter UE, and the second node is a receiver UE, the controller is operative to:

if the subframe scheduling mode indicates same subframe scheduling of the control channel and the user shared channel, interpret the time and/or frequency position indications in the control signaling as time and/or frequency position indications for the user shared channels of sidelink, for transmission of sidelink channels including the control channels and the user shared channels, and if the subframe scheduling mode indicates different subframe scheduling of the control channel and the user shared channel, interpret the time and/or frequency position indications in the control signaling as time and/or frequency position indications for the control channels of sidelink, for transmission of sidelink channels including the control channels and the user shared channels.

17. The apparatus according to claim 16, wherein, the control channels include Physical Downlink Control Channel (PDCCH), Enhanced Physical Downlink Control Channel (EPDCCH) and/or Physical Sidelink Control Channel (PSCCH), the user shared channel includes Physical Downlink Shared channel (PDSCH) and/or Physical Sidelink Shared Channel (PSSCH), and the control signaling includes Downlink Control Information (DCI) and/or Sidelink Control Information (SCI).

18. The apparatus according to claim 16, wherein, the same subframe scheduling mode of the control channels and the user shared channels is based on a resource pool configuration of the user shared channels or the control channels, wherein the resource pool consists of time/frequency resources which could be used for sidelink transmission, and wherein the same subframe scheduling mode of the control channels and the user shared channels indicates that the scheduling of the control channels and the user shared channels are scheduled in a same subframe, and the different subframe scheduling mode of the control channels and the user shared channels indicates that the scheduling of the control channels and the user shared channels are scheduled not in a same subframe.

19. The apparatus according to claim 16, wherein, the time and/or frequency position indications include at least one of:
(1) a start timing for initial transmission of a transport block or control channel;
(2) a frequency start position for the initial transmission of a transport block or control channel;
(3) a time gap between the initial transmission and a retransmission of a transport block or control channel;
(4) a frequency offset between the initial transmission and the retransmission of a transport block or control channel; and
(5) length of a transport block,
wherein in the case that the first node is an eNodeB (eNB), and the second node is a user equipment (UE), the time and/or frequency position indications transmitted by the eNB in downlink control information (DCI) include (2), (3), (4) and (5);
in the case that the first node is a transmitter UE, and the second node is a receiver UE, the time and/or frequency position indications transmitted by the transmitter UE in sidelink control information (SCI) include (3), (4) and (5).

20. The apparatus according to claim 19,
wherein, the controller is operative to, if subframe scheduling mode indicates a different subframe scheduling of the control channel and the user shared channel:
interpret a "time gap between initial transmission and retransmission" field in downlink control information (DCI)/sidelink control information (SCI) as a time relation between initial transmission and retransmission of the control channel;
interpret a "frequency resource location of initial transmission and retransmission" field in DCI/SCI as frequency resource location of retransmission of the control channel and length of the user shared channel; and
interpret a "lowest index of a sub-channel allocated to initial transmission" in DCI as a frequency start position of initial transmission of the control channel, if there is the "lowest index of a sub-channel allocated to initial transmission" in DCI.

* * * * *